United States Patent Office 3,504,932
Patented Apr. 7, 1970

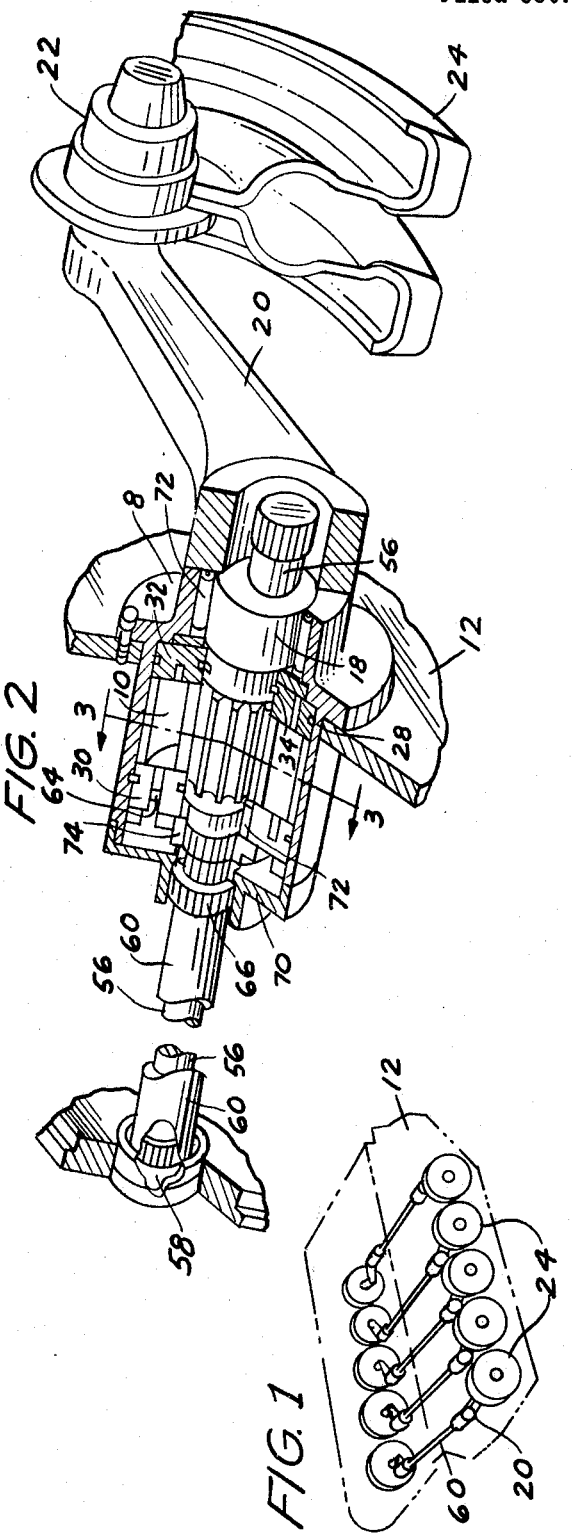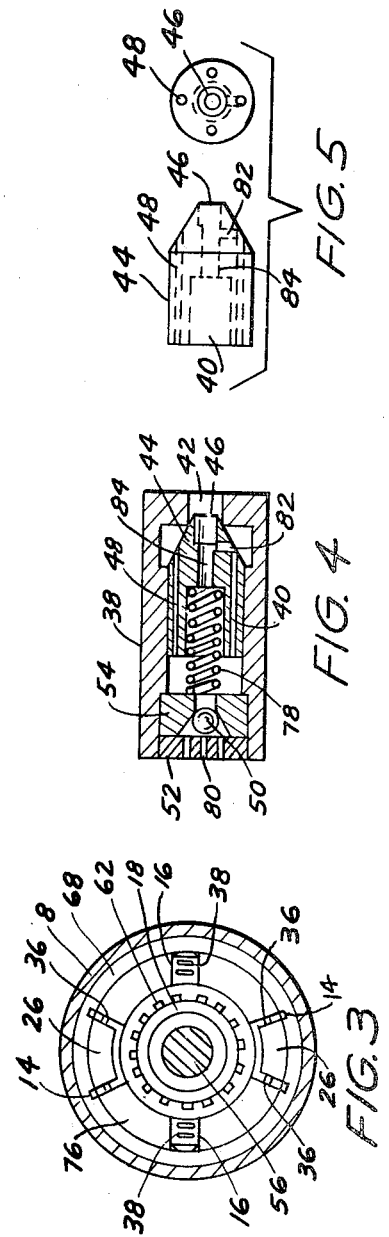

3,504,932
DUAL RATE DAMPENING DEVICE
Ted Kozowyk, Detroit, and Alex H. Sinclair, Southfield, Mich., assignors to the United States of America as represented by the Secretary of the Army
Filed Oct. 4, 1967, Ser. No. 672,937
Int. Cl. B60g 11/64, 7/04
U.S. Cl. 280—124                                6 Claims

ABSTRACT OF THE DISCLOSURE

An apparatus for providing dual rate dampening of a vehicle suspension system in a tracked or wheeled vehicle.

---

The invention described herein may be manufactured, used, and licensed by or for the Government for governmental purposes without payment to us of any royalty thereon.

This invention relates to a self-contained dampening device which provides dual rate variable dampening of a vehicle suspension system.

The principal object of the present invention is to provide a new and improved self-contained suspension vibration dampening device which provides dual rate variable dampening for a vehicle suspension system.

Another object of the invention is to provide a new and improved self-contained dampening device housed inside a vehicle structure to reduce vulnerability to hazards or obstacles, such as mud, dust and debris.

A further object of the invention is to provide a new and improved self-contained dampening device having disposed within the rotating vanes of same a unique self-operating valve structure.

The above and other objects of the invention will appear more fully from the following detailed description, and from the drawing, wherein:

FIGURE 1 is a view of a tank hull, partly broken away, to show the wheel suspension of same and the manner in which the dampeners are secured thereto;

FIGURE 2 is a sectioned isometric view of the dampener disposed across and within the vehicle with the roadarm and vehicle wheel attached;

FIGURE 3 is a section taken substantially along line 3—3 of FIGURE 2, through the dampener;

FIGURE 4 is a section of the valve incorporated in the movable vanes of the dampener; and FIGURE 5 shows in detail the plunger located in the valve shown in FIGURE 4.

Referring now to the drawing in detail wherein like reference characters designate like or corresponding parts throughout the several views, there is shown in FIGURE 2, a self-contained dampening device 10, which provides dual rate variable dampening of a vehicle suspension system, the same comprising a self-contained component or housing member 8 constructed of steel, or the like, housed inside of a vehicle hull structure 12 to reduce vulnerability to hazards or obstacle such as mud, dust and debris. Mounted within housing 8 are two stationary vane members 14, the same being secured to the inner periphery of a sleeve housing 68 which in turn is secured to housing 8 by two press-fitted pins, not shown, and two rotating vane members 16, the latter being splined to a spindle 18, which is splined to a road arm 20 having mounted thereon a wheel spindle 22 adapted to rotatably receive a wheel 24. A torsion bar 56 is inserted through the spindle 18 and coupled thereto.

The confines of stationary vanes 14 form an hydraulic reservoir 26 as an integral part of the vane section member. O-ring seals 28 are provided, the same being disposed within separators 30, 32. A "Teflon" seal ring 34 with rubber back-up seals is provided between the road arm spindle 18 and separators 30, 32.

Each stationary vane 14 has formed therein two one-directional check valves 36, the same being utilized to replenish the oil in a dampening unit cavity 76 formed between opposed stationary vanes 14.

Two dual rate dampening valves 38 are seated in each rotating vane 16 to allow oil to flow from the high pressure side of vane 16 to the low pressure side thereof from cavity 76.

The dampening valve 38, shown in detail in FIGURES 4 and 5, comprises a housing having an inlet port opening 42 leading into the interior of same. A plunger 44 is reciprocally disposed centrally within the housing, the same having a spring 78 partially disposed within a cavity 40 formed in plunger 44. A central orifice 46 is cored in plunger 44, together with four circumferentially located orifices 48. A ball-type check valve 50 is seated at the opposite end from inlet port 42 in a plug member 54. A screen type end retainer 52, having openings 80 therethrough, is seated in one end of housing 38 immediately behind check valve seat member 54.

The dampener housing 8 is mounted within one side of vehicle hull 12. The movable vanes 16 are mounted on splines 62 formed on spindle 18 and spindle 18 is coupled to torsion bar 56 and road arm 20 is coupled to spindle 18. The opposite end of torsion bar 56 is encased within a torsion tube 60 and the tube is journaled, as at 58, in the opposite side of the vehicle hull 12, FIGURE 2.

A pressure relief valve 64, FIGURE 2, is disposed within separator 30. The torsion tube 60 is splined, as at 66, to a torsion tube anchor member 70 which is bolted to housing 8. Bearings 72 are provided to seat the spindle 18 inside housing 8. Also a nut 74 is provided to hold the rotary vane member structure in alignment.

The manner in which the device operates is as follows:

The dampening device is functional only during vehicle travel, i.e., during the jounce and rebound of wheel travel.

When road wheel arm 20 is jounced the spindle 18, upon which roadarm 20 and rotary vanes 16 are mounted, actuates the movable dampener vanes 16 mounted thereon approximately 80°. Due to movement of arm 20 and vanes 16, hydraulic pressure is built up in oil-filled cavity 76 formed between vanes 14, 16. Oil from cavity 76 is displaced through dampening valves 38 seated in movable vanes 16, where dual rate dampening resistance to arm 20 is accomplished. Oil under pressure created by the movement of movable vanes 16 flows initially through inlet port opening 42 to port opening 46 located in plunger 44 where the flow is divided by means of side cored passageway 82 and axially cored passageway 84. At this point oil flows through four centrally located cored passageways 48 and through central opening 84 provided in plunger 44 and through opening in check valve seat 54 and displacing check ball 50 through screen plug 52 and openings 80 therein into the opposite side of movable vanes 16, thereby creating dampening resistance to the free movement of wheel 24.

When roadarm velocity becomes approximately six radians per second (a radian being a unit of plane angular measurement equal to the angle at the center of a circle subtended by an arc equal in length to the radius), the fluid pressure created by high angular movement of movable vanes 16 compresses spring 78 through its full stroke whereby plunger 44 becomes seated against check valve seat 54 closing the four circumferentially located passageways 48. In this position oil flows only through central orifices 46 and 84, thereby producing high dampening resistance. In this manner dual rate dampening is accomplished whereby high oil flow is permitted through dampening valve 38 under low road wheel velocity and a smaller flow of oil is accomplished under high road arm velocity.

If extreme shock load is applied to road wheel 24 so that high pressure is generated in the damper cavity 76, formed between stationary vanes 14 and movable vanes 16, and oil is lost through pressure relief valve 64 in member 30, FIGURE 2, the lost fluid is replenished from reservoir 26 through one way check valves 36 to dampener vane cavities 76.

There are two dampening valves in each movable vane, the same being disposed therein in reversed position in the vane. During the jounce motion oil is transmitted through one of said valves in one direction only, whereas the flow through the other set of valves is blocked by check valve 50, by which only one set of valves is functioning at a time in one direction in vane 16.

In the rebound direction the dampening function is accomplished in the same manner as described herein.

There has been disclosed herein a new and improved device which provides a parametric dampening of a vehicle to increase vehicle mobility, especially in the field of smoothness of ride. The device may be used alone, or can be coupled on the same torsion tube or bar with an actuator being used to raise or lower a vehicle.

Various changes and modifications can be made in the above described mechanism without departing from the spirit of the invention. Such changes and modifications are contemplated by the inventors.

We claim:
1. A dampener of the class described for use in combination with a wheeled or tracked vehicle, having incorporated therein,
   a torsion bar,
   a spindle,
   a roadarm movably mounted on said spindle,
   a wheel rotatably mounted on said roadarm,
   a dampener mounted on said vehicle adjacent said roadarm,
   said dampener comprising an oil containing housing member,
   stationary vane members secured to the interior of said housing, forming an oil reservoir therebetween,
   rotatable vane means mounted on said spindle, check valve members disposed within said stationary vane members, and
   dual rate dampening valves disposed within said movable vane means so that when said roadarm is jounced or rebound due to irregularities of terrain said movement caused by said jounce or rebound is imparted to said spindle, and said movable vane means having dual rate dampening valves therein mounted on said spindle provide dual rate dampening resistance for said roadarm.

2. A dampener as set forth in claim 1, wherein,
said valve means disposed within said movable vanes comprises,
a housing having a port opening at one end thereof,
a cored plunger having a central passageway therethrough reciprocally mounted within said housing,
a screened plug mounted in the opposite end of said housing,
a check valve mounted adjacent said plug member,
a spring member interposed between said check valve and said cored plunger, and
a plurality of longitudinally disposed openings in said plunger so arranged that fluid entering said port opening can pass either through said cored plunger to said screened plug or through said longitudinally disposed openings in said plunger forcing said plunger toward said check valve and closing said longitudinally disposed openings.

3. A dampener as set forth in claim 1, wherein,
said valve means disposed within said stationary vane members comprise means for allowing the flow of oil from the reservoir formed within said stationary vanes to an oil cavity formed between the stationary and rotating vanes, said valve means comprising a one-directional check valve.

4. A dampener as set forth in claim 1, wherein,
said dampener housing is divided into two compartments having a dividing wall therebetween, and
wherein one compartment houses said stationary and movable vane members, and
said dividing wall has seated therein a pressure relief valve to allow oil under pressure, caused by the movement of said movable vane members, to pass from the vane containing compartment to the compartment formed adjacent thereto and on to ground.

5. A dampener as set forth in claim 1, wherein,
said oil-filled dampener housing has mounted therein a separator having a relief valve disposed therein,
stationary vane members having an oil reservoir therein and two one-directional check valves therein,
movable vane members having two way dual rate dampening valves mounted therein,
oil cavities formed between said stationary and movable vanes whereby when said movable vanes are moved under extremely high angular velocity and oil from said cavities is displaced by means of said relief valve in said separator causing said fluid to be dissipated from said vane cavities,
said displaced oil is automatically replenished by means of oil from said stationary vane reservoir through said one-way check valve into said oil vane cavities.

6. A dampener as set forth in claim 1, wherein,
said check valve seated in said movable vane members are located in a reverse position therein so that during jounce motion of said vehicle wheel oil is transmitted through one valve only in one direction, and
whereas during the rebound direction of said vehicle wheel oil flows only through the reversed valve to accomplish the dampening function.

References Cited

UNITED STATES PATENTS

| | | | |
|---|---|---|---|
| 3,047,283 | 7/1962 | Kivell | 280—124 X |
| 3,117,800 | 1/1964 | Magnuson. | |
| 3,262,522 | 7/1966 | Johnson | 180—9.2 X |
| 3,237,728 | 3/1966 | Rumsey | 188—93 |
| 3,352,565 | 11/1967 | Reynolds | 180—9.2 X |
| 3,397,897 | 8/1968 | Schultze | 180—9.2 X |

RICHARD J. JOHNSON, Primary Examiner

U.S. Cl. X.R.

188—93; 305—27